United States Patent [19]

Compton et al.

[11] Patent Number: 4,487,079
[45] Date of Patent: Dec. 11, 1984

[54] DUAL RANGE FORCE TRANSDUCER

[75] Inventors: William H. Compton, Bratenahl; Joseph M. Likozar, Highland Heights, both of Ohio

[73] Assignee: Comptrol, Incorporated, Cleveland, Ohio

[21] Appl. No.: 468,204

[22] Filed: Feb. 22, 1983

[51] Int. Cl.³ .......................... G01L 1/04; G01L 1/26
[52] U.S. Cl. .............................. 73/862.52; 73/862.64
[58] Field of Search ............... 73/862.52, 711, 862.64; 177/164, 229, 234

[56] References Cited

U.S. PATENT DOCUMENTS

| | | | |
|---|---|---|---|
| 2,729,973 | 1/1956 | Strimel | 73/862.52 |
| 4,143,357 | 3/1979 | Baver et al. | 73/862.64 X |
| 4,287,776 | 9/1981 | Johnson | 73/862.52 |
| 4,307,787 | 12/1981 | Raboud et al. | 177/211 X |

FOREIGN PATENT DOCUMENTS

| | | | |
|---|---|---|---|
| 143421 | 11/1980 | Japan | 73/862.52 |
| 750445 | 6/1956 | United Kingdom | 73/862.64 |

Primary Examiner—Charles A. Ruehl
Attorney, Agent, or Firm—John F. Luhrs

[57] ABSTRACT

A force transducer producing two output signals having different proportionalities to the magnitude of a force applied to a force receiving platform cantilevered from a base through a C-shaped flexure producing a displacement of the platform proportional to the magnitude of the applied force, a first LVDT (Linear Voltage Differential Transformer) having a movable armature directly connected to the force receiving platform generating a first output signal proportional to the displacement of the force receiving platform and a second LVDT having a movable armature connected to the force receiving platform through a motion multiplying linkage generating a second output signal having a different proportionality to the displacement of the force receiving platform.

6 Claims, 1 Drawing Figure

U.S. Patent  Dec. 11, 1984  4,487,079
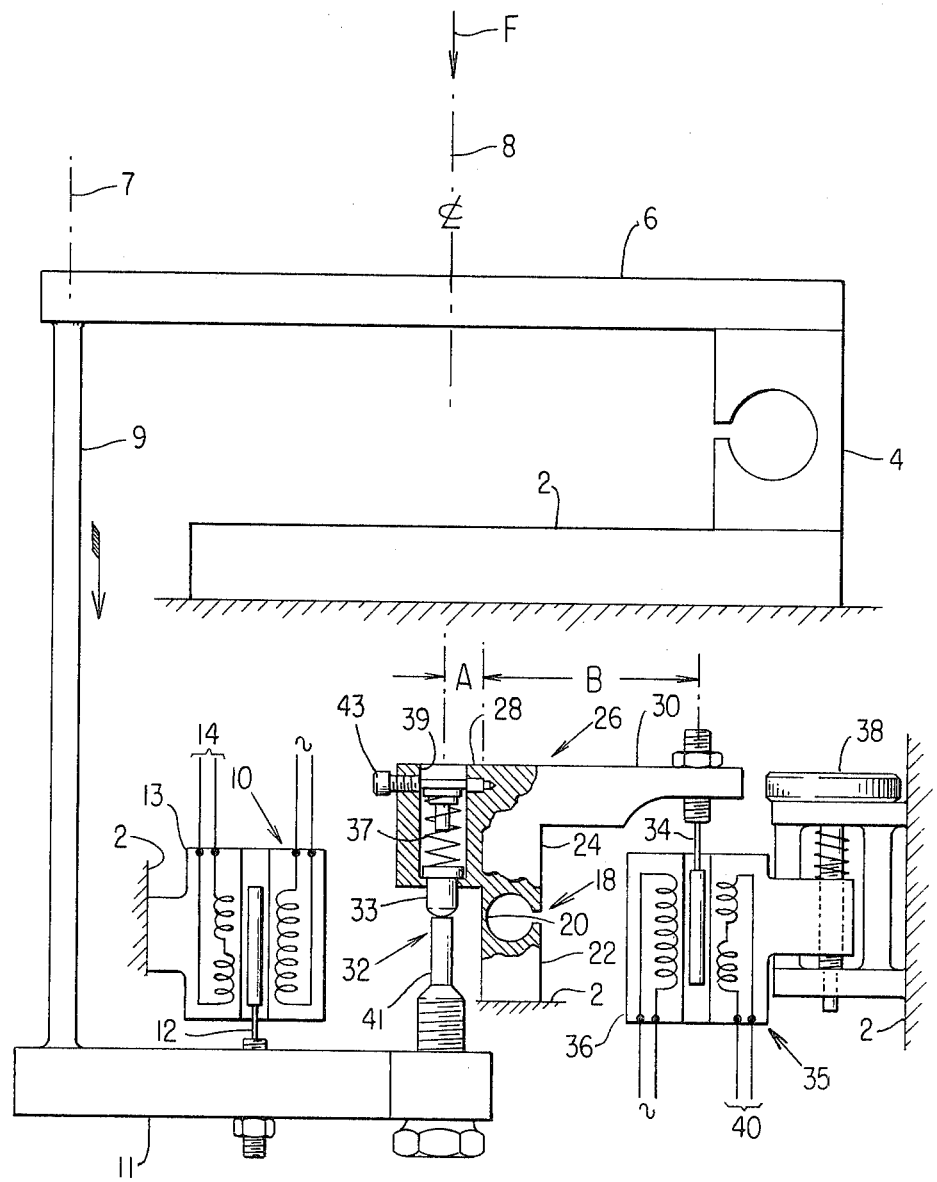

DUAL RANGE FORCE TRANSDUCER

This invention relates to a force transducer generating two output signals each bearing a discrete relationship to an input force such as weight, axial thrust of a rotating shaft, or to a physical condition or quantity, the magnitude of which can be translated into a proportional force, such as pressure, temperature, rate of fluid flow, the tension in a continuous strip of material or wire as it passes along a processing line.

Force transducers presently available of the type to which this invention relates, in general, comprise a support base and a force receiving platform disposed in spaced apart parallel planes. The platform is cantilevered from the support base through a spring flexure. A force applied normal to the platform at a predetermined distance from the spring flexure produces a deflection from a null position proportional to the magnitude thereof.

A control couple having relatively movable elements, such as, but not limited to, an LVDT (Linear Voltage Differential Transformer), a capacitance bridge, a pilot valve, having one element connected to the platform and the other element supported from the base, generates an output signal proportional to the platform displacement from the null position and accordingly proportional to the applied force.

The reference accuracy of a transducer of the type to which this invention relates is ordinarily expressed in percent of span. The accuracy expressed in percent therefore varies in inverse relationship to the applied force. A force transducer having accuracy limits of ±0.50 percent at one hundred percent of span is assumed to have accuracy limits of ±1.00 percent at fifty percent of span: ±2.00 percent at twenty five percent of span and ±5.00 percent at ten percent of span. It is apparent that such a transducer has an acceptable accuracy over a limited range end is not satisfactory for those applications requiring a high degree of accuracy over an extended force range or span.

In contrast to this and as a principle objective this invention comprehends a force transducer generating two output signals which bear a predetermined but different relationship to the magnitude of the applied force. This objective as well as other objectives will be apparent as the description proceeds in connection with the drawing, in which:

IN THE DRAWING

The drawing is an expanded view of a force transducer in which are incorporated the features of this invention.

DETAILED DESCRIPTION

Referring now to the drawing there is shown a force transducer having a rigid rectangular support base 2 from which is cantilevered through a C-shaped spring flexure 4, a force receiving platform 6. In the null or no-load position the platform 6 is preferably parallel to the support base 2. A force F of given magnitude applied normal to the force receiving platform 6 along a reference center-line of loading 8 is balanced when the displacement of the platform 6 from the null position generates an equal and opposite force by flexing of the C-shaped flexure 4. The transducer can be calibrated by a variety of auxiliary means (not shown); but examples of which are illustrated and described in U.S. Pat. Nos. 3,358,502; 3,492,865 and 4,287,776 to produce a desired linear deflection, usually in the order of 0.050 inches at the point of motion take-off 7 on the force receiving platform 6.

Connecting a control couple, generally indicated a 10, to the platform 6 at motion take-off point 7 is a linkage shown as comprising a rod 9 and cross-bar 11. In the embodiment of the invention shown, the control couple 10 comprises an LVDT having an armature 12, adjustably secured in the cross-bar 11, and stationary coils 13, supported from the base 2, for generating an output signal which can be transmitted through leads 14 to a suitable indicator, recorder, controller, or other form of utilization device.

Also incorporated in the force transducer is a C-shaped flexure, generally indicated at 18, having a thin mid-section 20 and a rigid section 22 supported from the base 2. The opposed rigid section 24 is in effect fulcrumed from the thin mid-section 20 and is formed to provide a lever 26 of the first class having moment arms 28 and 30 of effective lengths A and B respectively. The arm 28, having an effective length A, is connected to the cross-bar 11 through a break-away coupling, generally indicated at 32, and comprised of a follower 33 and leader screw 41 adjustably secured in the cross-bar 11. The follower 33 is disposed within and urged against the bottom of a recess 39, formed in the arm 28, by a spring 37 retained in the recess by a pin 43. The arm 30, having an effective length B, is connected to the armature 34 of an LVDT, generally indicated at 35, having stationary coils 36 supported from the base 2 through a micrometer screw 38 for generating an output signal which may be transmitted through leads 40 to a suitable indicator, recorder, controller, or other form of utilization device.

The displacement of armature 34 relative to the displacement of armature 12 for a given change in applied force will be proportional to the ratio between the effective length B and the effective length A. Thus, for example, if the ratio between lengths A and B is six to one, the displacement of the armature 34 will be six times as great as the displacement of armature 12 for a given change in the applied force F.

In the usual application of a force transducer the objective is to increase the range or span of input force over which an output signal of acceptable accuracy is obtained. Thus at null position of the force receiving platform 6, the LVDT 10 is nulled, i.e. to produce a zero signal output at leads 14, by adjusting armature 12 in cross-bar 11. The flexure 18 is pre-stressed by adjusting leader screw 41 upwardly, as shown in the drawing, from the null position to produce a displacement of the armature 34 at least equal to the displacement of cross-bar 11 at the max. predetermined applied force. The LVDT is then nulled by means of the micrometer screw 38 and/or positioning the armature 34 relative to the arm 30 to produce a zero output signal at leads 40. Assuming, for example, a 0.050 inch travel downwardly of the cross-bar 11 from the null position as the applied force F increases from zero to a predetermined maximum value, the armature 12 will similarly travel 0.050 inches and the output signal at least 14 will increase from zero to a predetermined maximum value. However, because of the travel multiplying effect of lever 26 the output signal at leads 40 will increase from zero to the predetermined maximum value at a fraction of the 0.050 inch travel of cross-bar 11.

When the cross-bar 11 has traveled the fraction of total travel required to generate the maximum signal output at leads 40, the flexure 18 will be in the null position as shown in the drawing. With further travel of the cross-bar 11, follower 33 will separate from the leader screw 41 thus preventing a reverse stress on the flexure 18 and a reverse output signal from the LVDT 35. Similarly, should the actual applied force exceed the predetermined maximum applied force, spring 37 will permit excess travel of cross-bar 11 above the predetermined amount without corresponding positioning of lever 26.

Assume, for example, that the ratio between the effective lengths of arms 30 and 28 is four to one, then the output signal at leads 40 will be at the maximum predetermined value at twenty five percent of the 0.050 inch travel of cross-bar 11. While at twenty five percent of the 0.050 inch travel of cross-bar 11 the output signal at leads 14 will have accuracy limits of ±2.00 percent, the accuracy limits of the output signal at leads 40 will be ±0.50 percent and an accuracy of at least ±2.00 percent will be maintained from a predetermined maximum applied force F down to approximately 6.25 percent of the maximum applied force F.

While the range of the applied force F over which an acceptable accuracy is obtained will be shortened by decreasing the ratio between the effective length B and effective length A, a desired overlap between the signal outputs at leads 40 and 14 may be obtained by so doing.

The signal outputs from leads 14 and 40, may as heretofor stated, go to separate arrays of a recorder, indicator, controller, or other form of utilization device. By means of an automatic or manual transfer switch one such array may be incorporated in the system, due consideration being given to the relative spans or ranges of the two output signals.

We claim:

1. A force transducer generating dual output signals each of which bears a predetermined but different proportionality to a force, comprising, a force receiving platform cantilevered from a base through a first spring flexure to produce a displacement of said force receiving platform from a null position proportional to the magnitude of a force applied to said force receiving platform, a first control couple having relatively movable elements connected to said base and platform respectively generating a first output signal having a first proportionality to the displacement of said force receiving platform from the null position, a second control couple having relatively movable elements, one of said elements of said second control couple connected to said base, a lever connected to said platform and the other of said elements of said control couple multiplying the relative movement between said elements of said second control couple for a given displacement of said force receivng platform from the null position to thereby generate a second output signal of different magnitude than the output signal generated by said first control couple for a given displacement of said force receiving platform from the null position.

2. A force transducer as set forth in claim 1 wherein said lever is a lever of the first class having a null position and provided with a fulcrum disposed between opposed moment arms, means operatively connecting one of said moment arms to said platform and the other of said arms to said other element of said second control couple.

3. A force transducer as set forth in claim 2 wherein said fulcrum comprises a second spring flexure having a null position, a thin middle section and opposed rigid outer sections, one of which is secured to said base and the other of which includes said opposed moment arms.

4. A force transducer as set forth in claim 3 wherein said means operatively connecting one of said moment arms to said force receiving platform includes adjustable means stressing the thin middle section of said second spring flexure to one side of said null position.

5. A force transducer as set forth in claim 4 wherein said means connecting one of said moment arms to said force receiving platform further includes a break-away coupling breaking the connection between said last named moment arm and said force receiving platform to inhibit the displacement of said second spring flexure to the other side of the null position.

6. A force transducer as set forth in claim 3 wherein said first and second spring flexures are C-shaped spring flexures.

* * * * *